W. R. STRICKLAND.
MOTOR VEHICLE.
APPLICATION FILED JAN. 7, 1914.

1,224,973.

Patented May 8, 1917.

Witnesses
Inventor
William R. Strickland
by Thurston & Kwis
Attys.

UNITED STATES PATENT OFFICE.

WILLIAM R. STRICKLAND, OF CLEVELAND, OHIO, ASSIGNOR TO THE PEERLESS MOTOR CAR COMPANY, OF CLEVELAND, OHIO, A CORPORATION OF OHIO.

MOTOR-VEHICLE.

1,224,973.  Specification of Letters Patent.  Patented May 8, 1917.

Application filed January 7, 1914. Serial No. 810,743.

*To all whom it may concern:*

Be it known that I, WILLIAM R. STRICKLAND, a citizen of the United States, residing at Cleveland, in the county of Cuyahoga and State of Ohio, have invented a certain new and useful Improvement in Motor-Vehicles, of which the following is a full, clear, and exact description.

This invention relates to motor vehicles, and particularly to an improvement in the manner of connecting the forward end of the rear spring with the chassis frame in those constructions wherein the driving stresses between the chassis frame and rear axle or running gear are transmitted through the rear springs.

The main object of the invention is to provide a connection between the spring and chassis frame which while capable of transmitting the load and driving stresses, affords sufficient flexibility to avoid distortion of the parts and breakage of the spring pin due to relative side movement between the chassis frame and running gear.

It is very common to drive or transmit driving stresses from the rear axle to the chassis frame through the rear side springs, but in prior constructions, in order that this might be done the forward end of the rear spring is usually connected to a pin mounted in a bracket which is fixed to and is rigid with the chassis frame, the only relative movement possible between the spring and chassis being that which takes place in a vertical plane due to the vibration of the spring in its own plane. In consequence any relative lateral movement between the spring or running gear and chassis frame causes more or less severe twisting or bending stresses in the spring pin or bracket in which the pin is mounted, and frequently results in breakage of the pin or extreme wear in pin and bushing.

The present invention overcomes the above mentioned disadvantage and at the same time is efficient and satisfactory in other respects.

My invention may be briefly summarized as consisting in certain novel details of construction and combinations and arrangements of parts which will be described in the specification and set forth in the appended claims.

Figure 1:
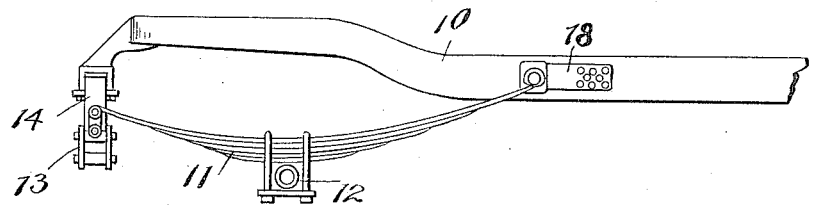
Figure 2:
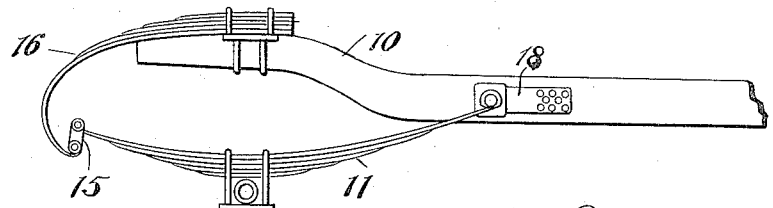
Figure 3:
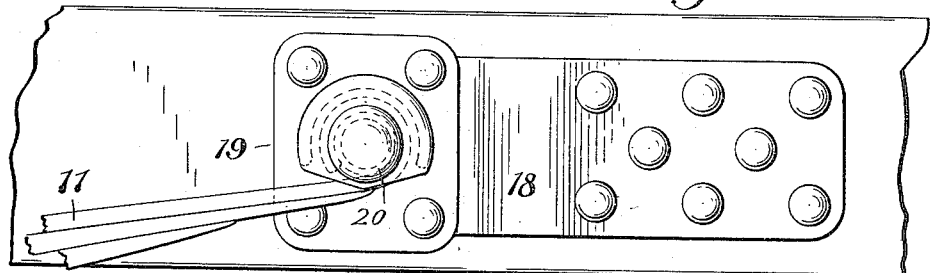
Figure 4:
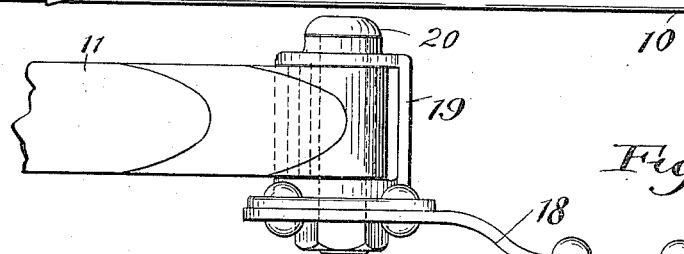

Figure 1 is a side view of the rear part of a chassis frame of an automobile and rear side spring showing the same in connection with a rear platform spring. Fig. 2 is a similar view, wherein the rear side spring forms a part of a so-called three-quarter elliptic spring. Fig. 3 is an enlarged side view of a portion of the chassis, the front end of the rear side spring and the flexible bracket between the spring and chassis; and Fig. 4 is a bottom view of the same.

In the drawing, 10 represents the rear part of one side of the chassis frame of a motor vehicle, 11 the rear side spring, and 12 the rear axle casing to which the spring is attached in the usual manner. It is immaterial with what particular spring construction the spring 11 may be utilized, and in the drawings, I have shown two common forms of spring constructions. For example, in Fig. 1, the rear end of the spring 11 is attached by a compound shackle to the rear platform spring 14. In Fig. 2 the rear end of the spring 11 is connected by a shackle 15 to a quarter elliptic spring 16, so that the springs 11 and 16 form the common three-quarter elliptic spring.

In constructions of this type, wherein the driving stresses are transmitted between the running gear or rear axle and the chassis through the rear springs 11, it is essential that the connecting means between the forward end of the spring and the chassis frame be capable of transmitting not only the load but the driving stresses. Hence it has been customary to connect the forward end of the spring 11 to a pin which in some manner is rigidly attached to the chassis, it being customary to mount the pin in a bracket which is rigid with and is firmly secured to the chassis.

While the spring and chassis connections of the character just referred to transmit very effectively the stresses which are required to be transmitted between the spring and chassis frame, the connections heretofore used are so rigid that any relative side swaying movements between the running gear and chassis frame must, of necessity, subject the spring pin to which the end of the spring is attached, or the bracket in which the pin is mounted, to bending or twisting stresses, and, as before stated, these stresses often result in the breaking of the pin.

To overcome this objection, I utilize for connecting the forward end of the spring to the chassis frame a spring bracket 18, which is rigid vertically and longitudinally for transmission of load and driving stresses but is flexible transversely of the car or laterally. This bracket 18 consists of a flat member, which at one end, in this case the forward end, is riveted or otherwise secured to the chassis, and which has its rear portion somewhat offset laterally with respect to the chassis frame, and to this offset portion is fixed a bracket or housing 19, in which is mounted a pin 20 to which the end of the spring 11 is secured. This spring bracket 18, while sufficiently stiff to transmit the load and driving stresses, has sufficient flexibility that it will yield laterally so as to permit a slight relative movement between the spring and chassis frame, due to the side swaying of the chassis frame relative to the spring caused by the wheels passing over any unevenness in the road. This feature relieves the spring pin and bracket 19 from the twisting or bending stresses to which they were formerly subjected, and minimizes the liability of breakage. At the same time, the construction has all the advantages of the prior rigid constructions.

It is immaterial whether the forward end of the spring bracket is secured to the chassis frame, as in this instance, or whether the forward end is secured to the leaf spring, and its rear end to the chassis frame. In the former case, the spring bracket is under compression in transmitting driving stresses, and in the latter case under tension. Furthermore, it is not essential that the spring bracket be offset laterally to produce the clearance between bracket and chassis frame as either the bracket or frame may be offset.

Having thus described my invention, what I claim is:

1. In a motor vehicle construction, in combination with a chassis frame, a spring extending along the side of the frame, a flexible bracket connecting the forward end of the spring to the chassis frame and permitting relative lateral movement between the spring and the chassis frame, a housing carried by said bracket, and a pin journaled in said housing and connected to the spring.

2. In a motor vehicle construction, in combination with a chassis frame, a spring extending along the chassis frame, a strap of flexible material secured at one end to the chassis said strap being bent outwardly from the chassis and at its free end secured to the said spring, a yoke or housing secured to the free end of the said strap, a pin rotatively mounted in said housing or yoke said pin engaging the aforesaid spring.

In testimony whereof, I hereunto affix my signature in the presence of two witnesses.

WILLIAM R. STRICKLAND.

Witnesses:
L. I. PORTER,
A. F. KWIS.

Copies of this patent may be obtained for five cents each, by addressing the "Commissioner of Patents, Washington, D. C."